(12) United States Patent
Ichikawa

(10) Patent No.: US 10,326,385 B2
(45) Date of Patent: Jun. 18, 2019

(54) ELECTRIC WORKING MACHINE AND METHOD FOR BRAKING THREE-PHASE BRUSHLESS MOTOR OF ELECTRIC WORKING MACHINE

(71) Applicant: MAKITA CORPORATION, Anjo-shi, Aichi (JP)

(72) Inventor: Yoshitaka Ichikawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/992,530

(22) Filed: May 30, 2018

(65) Prior Publication Data

US 2018/0367070 A1 Dec. 20, 2018

(30) Foreign Application Priority Data

Jun. 15, 2017 (JP) ................. 2017-117685

(51) Int. Cl.
*H02P 6/24* (2006.01)
*H02P 3/22* (2006.01)
*H02P 3/12* (2006.01)
*B24B 23/02* (2006.01)
*B24B 47/12* (2006.01)
*B25F 5/00* (2006.01)
*H02P 6/00* (2016.01)

(52) U.S. Cl.
CPC .............. *H02P 3/12* (2013.01); *B24B 23/028* (2013.01); *B24B 47/12* (2013.01); *B25F 5/00* (2013.01)

(58) Field of Classification Search
None
See application file for complete search history.

(56) References Cited

U.S. PATENT DOCUMENTS

| | | | |
|---|---|---|---|
| 2013/0307446 A1 | 11/2013 | Ichikawa | |
| 2015/0137717 A1* | 5/2015 | Ishikawa | B25F 5/00 318/379 |
| 2017/0093315 A1 | 3/2017 | Ichikawa | |
| 2018/0050398 A1* | 2/2018 | Kumakura | B23D 45/16 |
| 2018/0071843 A1* | 3/2018 | Yoshinari | B25F 5/00 |
| 2018/0099372 A1* | 4/2018 | Takeda | B24B 23/02 |

FOREIGN PATENT DOCUMENTS

| | | |
|---|---|---|
| JP | 2013-243824 A | 12/2013 |
| JP | 2017-070102 A | 4/2017 |

* cited by examiner

*Primary Examiner* — Bentsu Ro
(74) *Attorney, Agent, or Firm* — Oliff PLC

(57) ABSTRACT

In one aspect of the present disclosure, an electric working machine includes a three-phase brushless motor, a first switching element, a second switching element, a third switching element, a fourth switching element, a fifth switching element, a sixth switching element, a rotation detector, a brake controller. The brake controller executes a two-phase short-circuit brake. The two-phase short-circuit brake is executed so as to switch any of the fourth switching element, the fifth switching element, and the sixth switching element to a corresponding ON-state or an OFF-state in response a detection signal from the rotation detector that occurs prior to a switching time.

11 Claims, 8 Drawing Sheets

ELECTRIC WORKING MACHINE AND METHOD FOR BRAKING THREE-PHASE BRUSHLESS MOTOR OF ELECTRIC WORKING MACHINE

CROSS-REFERENCE TO RELATED APPLICATIONS

This application claims the benefit of Japanese Patent Application No. 2017-117685 filed on Jun. 15, 2017 with the Japan Patent Office, the entire disclosure of which is incorporated herein by reference.

BACKGROUND

The present disclosure relates to an electric working machine that includes a three-phase brushless motor.

An electric working machine including a three-phase brushless motor as a driving source is configured to reduce or stop rotation of the three-phase brushless motor by using a so-called short-circuit brake. The short-circuit brake is achieved through three terminals of the three-phase brushless motor to be shorted, which generates a braking force on the three-phase brushless motor.

The short-circuit brake in general use is a three-phase short-circuit control, where a brake current flows into all phases of the three-phase brushless motor. Such a three-phase short-circuit control generates an excessive braking force, which results in increase in force that is applied to an electric apparatus due to the braking force and thus a failure may occur in the electric apparatus.

In respective electric working machines disclosed in Japanese Unexamined Patent Application Publication No. 2013-243824 and Japanese Unexamined Patent Application Publication No. 2017-070102, a two-phase short-circuit control is executed to thereby generate a desired braking force. In the two-phase short-circuit control, only two current paths are completed among three current paths between respective three terminals of a three-phase brushless motor and a positive electrode of a direct-current power source. Alternatively, only two current paths are completed among three current paths between the respective three terminals and a negative electrode of the direct-current power source.

In the two-phase short-circuit control, as shown in FIG. 7, for example, three high-side switches are tuned off. The high-side switches are switching elements that are provided on the three current paths between the respective three terminals corresponding to a U-phase, a V-phase, and a W-phase of the three-phase brushless motor and the positive electrode (H-side) of the direct-current power source.

On the other hand, three low-side switches are tuned on and off in accordance with rotation of the three-phase brushless motor. The low-side switches are switching elements that are provided on the three current paths between the respective terminals of the three-phase brushless motor and the negative electrode (L-side) of the direct-current power source.

To execute the two-phase short-circuit control, used is a rotation sensor that provides detection signals (Hall signals shown in FIG. 7) every time the motor rotates by a specific angle (every 60-degree in electrical angle, in FIG. 7).

In the two-phase short-circuit control, a delay time is set in a timer every time the motor rotates by the specific angle (at every time periods indicated by arrows in FIG. 7) that corresponds to the detection signals from the rotation sensor, and then measurement by the timer is started (a time point t1). The delay time corresponds to a time (a time corresponding to 30 degrees in electrical angle, in FIG. 7) until any of the low-side switches is next switched to an ON-state or an OFF-state.

In response to elapse of the delay time and an end of the measurement by the timer (a time point t2), any of the low-side switches is switched to the ON-state or the OFF-state in accordance with a specific switching pattern.

SUMMARY

In general, a rotation sensor includes three Hall elements. The respective three Hall elements correspond to a U-phase, a V-phase, and a W-phase of a three-phase brushless motor and are arranged at respective intervals of 120 degrees in electrical angle, in general.

If the Hall elements are deviated in position, a variation occurs in change time periods in respective detection signals (Hall signals) from the rotation sensor. As a result, the detection signals do not change every time the motor rotates by a specific angle (for example, 60 degrees in electrical angle).

Such a variation in the intervals (the change time periods) between the respective detection signals leads to a variation in respective delay times that are set in a timer, and this may consequently result in a failure to execute a brake control properly.

Specifically, as exemplary illustrated in FIG. 8, if the change time periods (t) in the respective Hall signals for the U-phase, the V-phase, and the W-phase are uneven as a result of the Hall elements being deviated in position, the intervals T1, T2, and T3 . . . between the respective detection signals become uneven. Consequently, this leads to unevenness of the delay times D1, D2, and D3 . . . , respectively, that are set based on the intervals T1, T2, and T3 . . . .

In such a circumstance, as shown in the upper section of FIG. 8, if the delay times D1, D2, and D3 . . . , respectively, are 50% of the respective intervals between the detection signals T1, T2, and T3 . . . (in a case where percentage is set as 50% in the timer), errors between the respective delay times D1, D2, and D3 . . . as a result of the variation in the respective Hall signals for the U-phase, the V-phase, and the W-phase is small. Thus, this is not developed into a significant problem.

For example, the delay times D1, D2, and D3 . . . , respectively, are set to 80% of the respective intervals between the detection signals T1, T2, and T3 . . . (in a case where the percentage is set as 80% in the timer) so as to reduce a braking force that is generated by the brake control. In this case, however, the errors between the respective delay times D1, D2, and D3 . . . are greater in comparison with the case where the percentage is set as 50% in the timer.

Consequently, as shown in "before countermeasure" in the middle section of FIG. 8, if, as a result of the errors, the long delay time D1 is set in the timer, this may cause the next delay time D2 to be set in the timer before elapse of the delay time D1.

In this case, as shown in a dotted line in FIG. 8, the brake control (switching of any of the low-side switches to the corresponding ON-state or the OFF-state) that should be executed in response to the elapse of the delay time D1 set in the timer at the corresponding change time period in the corresponding detection signal may not be executed.

In one aspect of the present disclosure, it is desirable to inhibit a failure to properly execute a two-phase short-circuit brake on a three-phase brushless motor of an electric working machine as a result of a variation in an interval in a detection signal from a rotation sensor.

In one aspect of the present disclosure, an electric working machine includes a three-phase brushless motor, a first switching element, a second switching element, a third switching element, a fourth switching element, a fifth switching element, a sixth switching element, a rotation detector, and a brake controller. The three-phase brushless motor includes a first terminal, a second terminal, and a third terminal. The first switching element is provided between the first terminal and a first electrode of a direct-current power source. The first switching element is configured to electrically couple the first terminal to the first electrode in an ON-state. The first switching element is configured to electrically decouple the first terminal from the first electrode in an OFF-state. The second switching element is provided between the second terminal and the first electrode. The second switching element is configured to electrically couple the second terminal to the first electrode in an ON-state. The second switching element is configured to electrically decouple the second terminal from the first electrode in an OFF-state. The third switching element is provided between the third terminal and the first electrode. The third switching element is configured to electrically couple the third terminal to the first electrode in an ON-state. The third switching element is configured to electrically decouple the third terminal from the first electrode in an OFF-state. The fourth switching element is provided between the first terminal and a second electrode of the direct-current power source. The fourth switching element is configured to electrically couple the first terminal to the second electrode in an ON-state. The fourth switching element is configured to electrically decouple the first terminal from the second electrode in an OFF-state. The fifth switching element is provided between the second terminal and the second electrode. The fifth switching element is configured to electrically couple the second terminal to the second electrode in an ON-state. The fifth switching element is configured to electrically decouple the second terminal from the second electrode in an OFF-state. The sixth switching element is provided between the third terminal and the second electrode. The sixth switching element is configured to electrically couple the third terminal to the second electrode in an ON-state. The sixth switching element is configured to electrically decouple the third terminal from the second electrode in an OFF-state.

The rotation detector generates a detection signal that indicates a rotation position of the three-phase brushless motor every time the three-phase brushless motor rotates by a specific angle. The rotation detector may include, for example, the above-described Hall elements.

The brake controller executes a two-phase short-circuit brake. The two-phase short-circuit brake is executed so as to set the first switching element, the second switching element, and the third switching element to the respective OFF-states and to switch any of the fourth switching element, the fifth switching element, and the sixth switching element to the corresponding ON-state or the OFF-state in accordance with a switching time that is based on the detection signal. The two-phase short-circuit brake is further executed so as to switch any of the fourth switching element, the fifth switching element, and the sixth switching element to the corresponding ON-state or the OFF-state in response to the detection signal that occurs prior to the switching time.

With the electric working machine configured as mentioned above, the any of the fourth switching element, the fifth switching element, and the sixth switching element is ensured to be switched to the corresponding ON-state or the OFF-state in response to the detection signal that occurs prior to the switching time.

Thus, the electric working machine can inhibit the failure to properly execute the two-phase short-circuit brake as a result of the variation in an interval in the detection signal.

The above-described electric working machine may include a timer that is configured to measure a time. In this case, the brake controller may include a timer setter that is configure to set in the timer a delay time until arrival of the switching time based on the detection signal and to start measurement for the delay time by the timer.

The brake controller may further include a switching controller that is configured to switch the any of the fourth switching element, the fifth switching element, and the sixth switching element to the corresponding ON-state or the OFF-state in response to completion of the measurement for the delay time by the timer.

The timer setter may be configured to switch, in place of the switching controller, the any of the fourth switching element, the fifth switching element, and the sixth switching element to the corresponding ON-state or the OFF-state in response to the delay time being newly set in the timer based on the detection signal before elapse of the delay time that is previously set in the timer.

In this case, the variation occurs in the interval in the detection signal and the delay time that is previously set may not be elapsed when the timer setter newly sets the delay time in the timer. Even in this case, it is possible to execute the two-phase short-circuit brake that corresponds to the previously set delay time.

Thus, it is possible to inhibit the failure to properly execute the two-phase short-circuit brake due to the variation in the interval in the detection signal.

In a case where the timer setter switches, in place of the switching controller, the any of the fourth switching element, the fifth switching element, and the sixth switching element to the corresponding ON-state or the OFF-state, this may be performed at a time period as it should be.

The timer setter may be configured to switch, in response to the delay time being newly set in the timer based on the detection signal before elapse of the delay time that is previously set in the timer, the any of the fourth switching element, the fifth switching element, and the sixth switching element to the corresponding ON-state or the OFF-state within a specific time after the rotation position of the three-phase brushless motor reaches a specific rotation position that is acquired based on the detection signal.

Alternatively, the timer setter may be configured to switch, in response to the delay time being newly set in the timer based on the detection signal before elapse of the delay time that is previously set in the timer, the any of the fourth switching element, the fifth switching element, and the sixth switching element to the corresponding ON-state or the OFF-state immediately after the rotation position of the three-phase brushless motor reaches a specific rotation position that is acquired based on the detection signal.

The first electrode may correspond to a positive electrode of the direct-current power source and the second electrode may correspond to a negative electrode of the direct-current power source.

Alternatively, the first electrode may correspond to a negative electrode and the second electrode may correspond to a positive electrode.

The brake controller may be configured to execute the two-phase short circuit brake in response to establishment of a brake condition during the three-phase brushless motor rotating.

Another aspect of the present disclosure is a method for braking a three-phase brushless motor of an electric working machine. The method may include generating a detection signal that indicates a rotation position of the three-phase brushless motor every time the three-phase brushless motor rotates by a specific angle.

The method may include setting a first switching element, a second switching element, and a third switching element to respective OFF-states in response to establishment of a brake condition during the three-phase brushless motor rotating, the first switching element being provided between a first terminal of the three-phase brushless motor and a first electrode of a direct-current power source, the first switching element being configured to electrically couple the first terminal to the first electrode in an ON-state, the first switching element being configured to electrically decouple the first terminal from the first electrode in the OFF-state, the second switching element being provided between a second terminal of the three-phase brushless motor and the first electrode, the second switching element being configured to electrically couple the second terminal to the first electrode in an ON-state, the second switching element being configured to electrically decouple the second terminal from the first electrode in the OFF-state, the third switching element being provided between a third terminal of the three-phase brushless motor and the first electrode, the third switching element being configured to electrically couple the third terminal to the first electrode in an ON-state, and the third switching element being configured to electrically decouple the third terminal from the first electrode in the OFF-state.

The method may include switching any of a fourth switching element, a fifth switching element, and a sixth switching element to a corresponding ON-state or an OFF-state in accordance with a switching time that is based on the detection signal in response to the establishment of the brake condition during the three-phase brushless motor rotating, the fourth switching element being provided between the first terminal and a second electrode of the direct-current power source, the fourth switching element being configured to electrically couple the first terminal to the second electrode in the ON-state, the fourth switching element being configured to electrically decouple the first terminal from the second electrode in the OFF-state, the fifth switching element being provided between the second terminal and the second electrode, the fifth switching element being configured to electrically couple the second terminal to the second electrode in the ON-state, the fifth switching element being configured to electrically decouple the second terminal from the second electrode in the OFF-state, the sixth switching element being provided between the third terminal and the second electrode, the sixth switching element being configured to electrically couple the third terminal to the second electrode in the ON-state, and the sixth switching element being configured to electrically decouple the third terminal from the second electrode in the OFF-state.

The method may include switching the any of the fourth switching element, the fifth switching element, and the sixth switching element to the corresponding ON-state or the OFF-state in response to the detection signal that occurs prior to the switching time.

With such a method, it is possible to inhibit a failure to properly execute the two-phase short-circuit brake for the three-phase brushless motor as a result of a variation in an interval in the detection signal.

BRIEF DESCRIPTION OF THE DRAWINGS

Hereinafter, an example embodiment of the present disclosure will be described with reference to the accompanying drawings, in which.

DETAILED DESCRIPTION OF THE PREFERRED EMBODIMENTS

In the present embodiment, a grinder that performs, for example, grinding, polishing, and cutting of a material to be processed will be described as one example of an electric working machine of the present disclosure.

Figure 1:
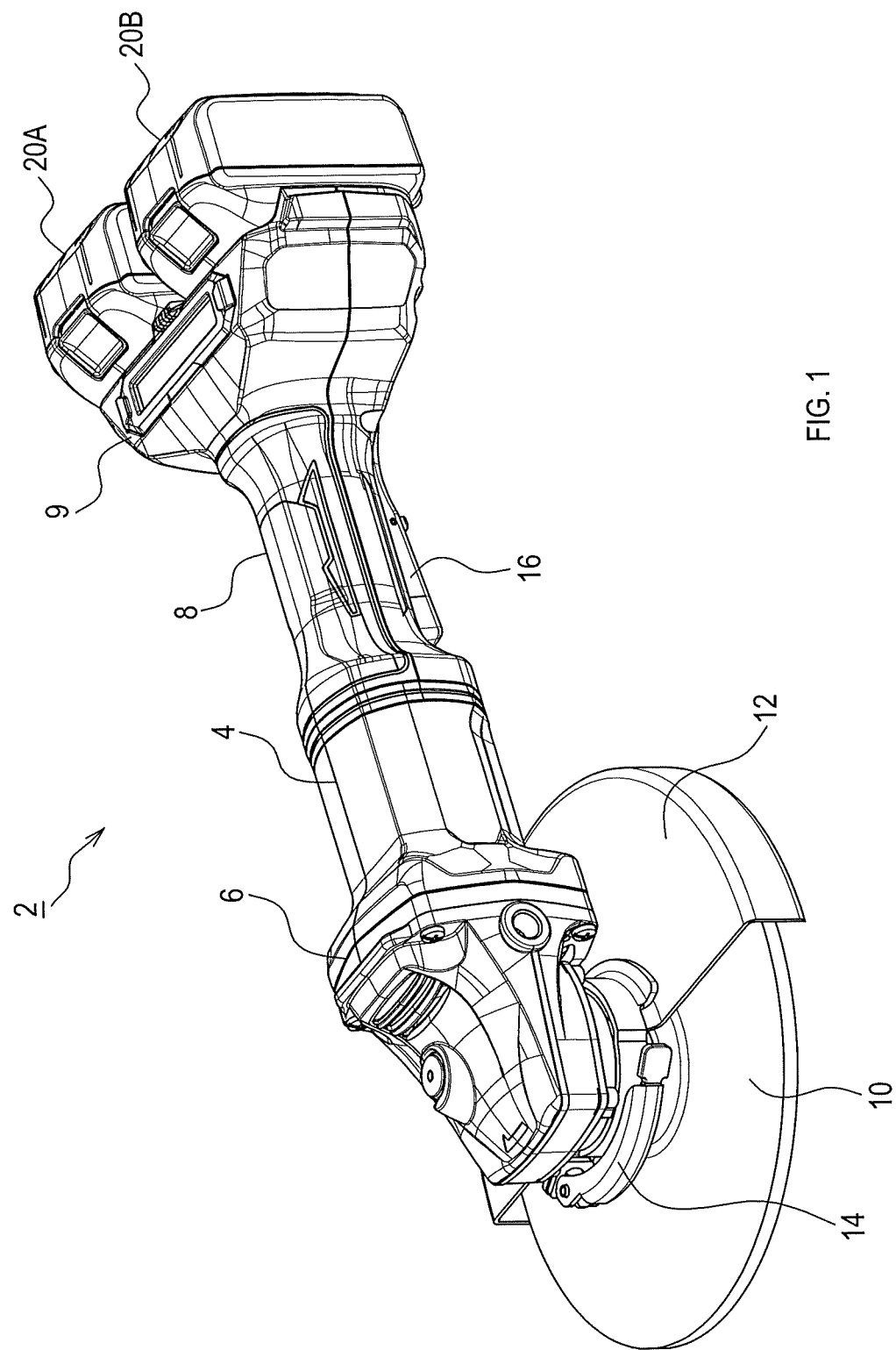
FIG. 1 is a perspective view of a grinder showing a configuration of the grinder in a present embodiment.

As shown in FIG. 1, a grinder 2 of the present embodiment includes a motor housing 4, a gear housing 6, and a rear housing 8. The motor housing 4, the gear housing 6, and the rear housing 8 may be integrally assembled to each other to form a main body portion of the grinder 2.

The motor housing 4 may be formed in a cylindrical shape. The motor housing 4 may have the outer diameter that allows a user of the grinder 2 to grip the motor housing 4 with one hand. The motor housing 4 houses a motor 5 shown in FIG. 2 in the motor housing 4. The motor 5 of the present embodiment is a three-phase brushless motor.

The motor 5 is arranged in the motor housing 4 such that a rotation shaft of the motor 5 is in parallel with and substantially coaxial with the central axis of the motor housing 4. The rotation shaft of the motor 5 protrudes toward the gear housing 6.

As with the motor housing 4, the rear housing 8 may be formed in a substantially cylindrical shape. The rear housing 8 is located in a first longitudinal end of the motor housing 4 (specifically, at a side opposite to the gear housing 6). In a first longitudinal end of the rear housing 8 (specifically, at a side opposite to the motor housing 4), an attachment portion 9 is located. The attachment portion 9 has a first battery pack 20A and a second battery pack 20B that are detachably attached to the attachment portion 9.

Figure 2:
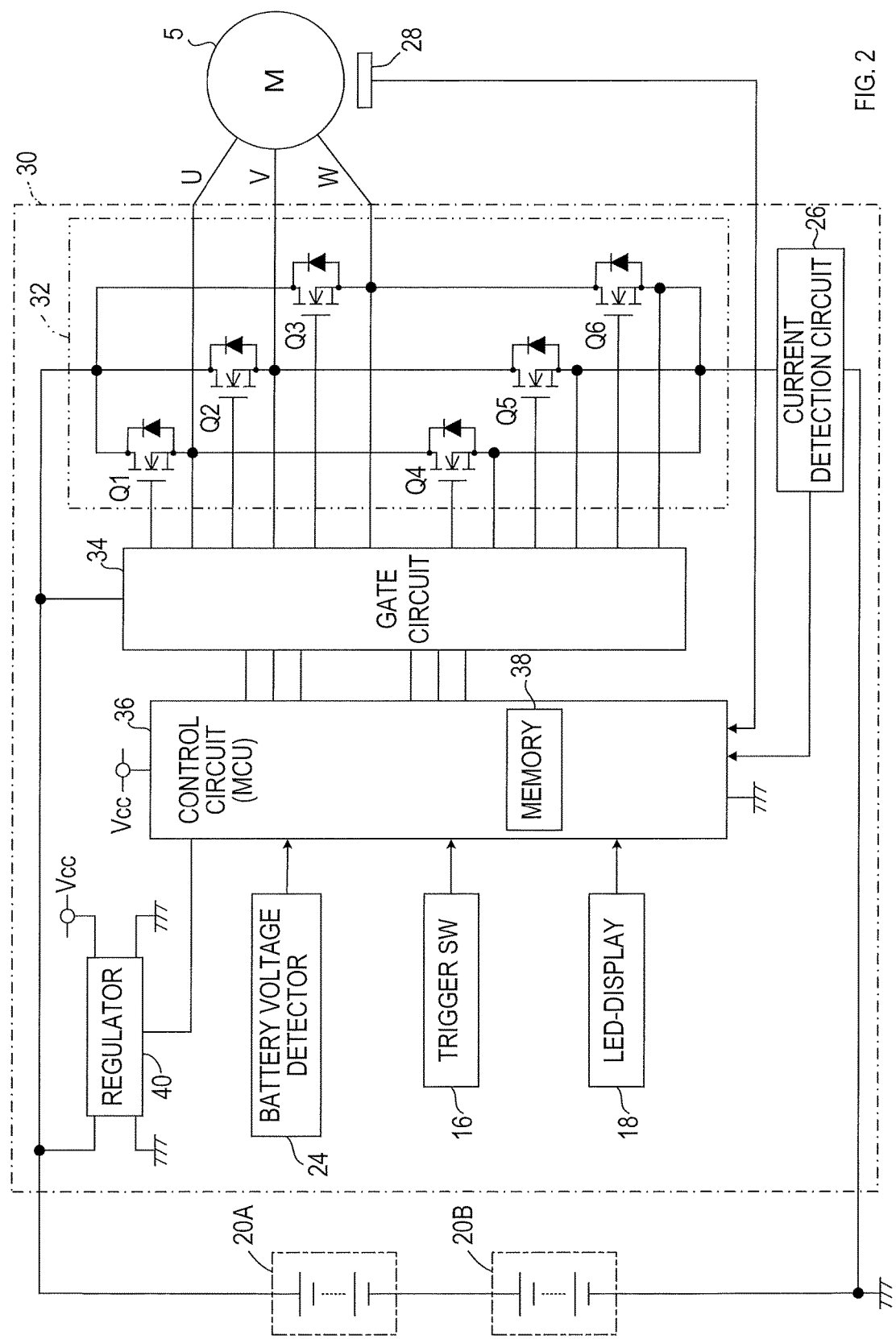
FIG. 2 is a block diagram showing a configuration of a motor drive circuit that is provided to the grinder.

The attachment portion 9 houses therein a motor drive circuit 30 shown in FIG. 2.

The rear housing 8 includes a trigger switch 16. The trigger switch 16 is configured such that the user can perform a pulling operation of the trigger switch 16 while gripping the rear housing 8.

The gear housing 6 is located in a second longitudinal end of the motor housing 4 (specifically, at a side opposite to the rear housing 8). The gear housing 6 houses a gear mechanism. The gear mechanism is configured to transmit a rotation of the motor 5 to an output shaft that is perpendicular to the rotation shaft of the motor 5. The output shaft protrudes from the gear housing 6. To the protruded portion of the output shaft, fixed is a tip tool 10 having a circular-plate shape, such as a grinding wheel and a cutting-off wheel.

Accordingly, the grinder 2 is designed to rotate the tip tool 10 in response to driving of the motor 5, to thereby enable grinding, polishing, and cutting works.

Further, there may be disposed a wheel cover 12 around the tip tool 10. The wheel cover 12 eliminates or reduces dust that is generated during the grinding, polishing, and cutting works from dispersing toward the user, to thereby protect the user.

The wheel cover 12 may be formed in a substantially semicircular shape so as to cover a portion of (substantially a half of) the tip tool 10 from a gear housing 6-side. The wheel cover 12 may be fixed via a ring-shaped fixing member 14 around a portion of the gear housing 6 from which the output shaft protrudes.

As shown in FIG. 2, the motor drive circuit 30 is supplied with electric power from the first battery pack 20A and the second battery pack 20B that are connected in series. The motor drive circuit 30 is configured to perform a drive control of the motor 5 such that the motor 5 is driven and stopped corresponding to an operation state of the trigger switch 16. Specifically, the motor drive circuit 30 includes a bridge circuit 32, a gate circuit 34, a control circuit 36, and a regulator 40.

The bridge circuit 32 is configured to supply from the first battery pack 20A and the second battery pack 20B an electric current to a not shown U-phase winding, a not shown V-phase winding, and a not shown W-phase winding of the motor 5, respectively. The bridge circuit 32 of the present embodiment includes six switching elements Q1 to Q6 and forms a so-called three-phase full bridge circuit.

The switching elements Q1 to Q3 are provided as so-called high-side switches, respectively, between terminals U, V, and W of the motor 5 and a positive electrode power-supply line. The terminals U, V, and W, respectively, are coupled to the U-phase winding, the V-phase winding, and the W-phase winding. The positive electrode power-supply line is coupled to a positive electrode of the first battery pack 20A. Respective positive electrode-side current paths between the terminals U, V, and W of the motor 5 and the positive electrode power-supply line are completed when the respective switching elements Q1 to Q3 are placed in respective ON-states.

The switching elements Q4 to Q6 are provided as so-called low-side switches, respectively, between the terminals U, V, and W and a ground line. The ground line is coupled to a negative electrode of the second battery pack 20B. Respective negative electrode-side current paths between the terminals U, V, and W of the motor 5 and the ground line are completed when the respective switching elements Q4 to Q6 are placed in respective ON-states.

Further, in the present embodiment, each of the switching elements Q1 to Q6 may be an n-channel metal oxide silicon field-effect transistor (MOSFET). In this case, respective diodes (so-called, parasitic diodes) are connected in parallel to the switching elements Q1 to Q6 between respective drains and sources of the switching elements Q1 to Q6. A forward direction of each diode corresponds to a source-to-drain direction.

Accordingly, in respective OFF-states of the switching elements Q1 to Q6, each diode allows the electric current to flow in a reverse direction from the negative electrode side of the second battery pack 20B to the positive electrode side of the first battery pack 20A.

The gate circuit 34 is configured to turn on and off the switching elements Q1 to Q6 in accordance with respective control signals outputted from the control circuit 36. With such an operation of the gate circuit 34, a drive current or a motor brake current is supplied to the U-phase winding, the V-phase winding, and the W-phase winding of the motor 5, thus rotating and braking the motor 5.

The control circuit 36 is configured to control driving and braking of the motor 5 via the gate circuit 34. The control circuit 36 includes a Micro Control Unit (MCU) that includes a CPU, a ROM, and a RAM. The control circuit 36 includes a non-volatile memory 38 for storing respective states (for example, failure state) of the motor 5 and the motor drive circuit 30 that are controlled by the control circuit 36. The control circuit 36 may include, instead of or in addition to the MCU, a combination of individual electronic components, Application Specified Integrated Circuit (ASIC), Application Specific Standard Product (ASSP), a programmable logic device such as Field Programmable Gate Array (FPGA), or the combination thereof.

The control circuit 36 is coupled to the above-described trigger switch (SW) 16 and a LED-display 18 that is located on the motor housing 4 or the rear housing 8.

In addition, the control circuit 36 is coupled to a battery voltage detector 24, an electric current detection circuit 26, and a rotation detector 28. The control circuit 36 controls the motor 5 based on respective detection signals that are outputted from the trigger SW16, the battery voltage detector 24, the electric current detection circuit 26, and the rotation detector 28.

The battery voltage detector 24 detects a value of a voltage (hereinafter referred to as a "battery voltage value") that is supplied from the first battery pack 20A and the second battery pack 20B.

The electric current detection circuit 26 is located between the bridge circuit 32 and the ground line and detects a value of an electric current (hereinafter referred to as a "motor current value") that flows through the motor 5.

The rotation detector 28 generates the detection signals every time the motor 5 rotates by a specific angle (60 degrees in electrical angle, in the present embodiment). The rotation detector 28 includes three Hall elements that are arranged at respective intervals of 120 degrees in electrical angle. The respective three Hall elements correspond to the U-phase winding, the V-phase winding, and the W-phase winding.

Figure 7:
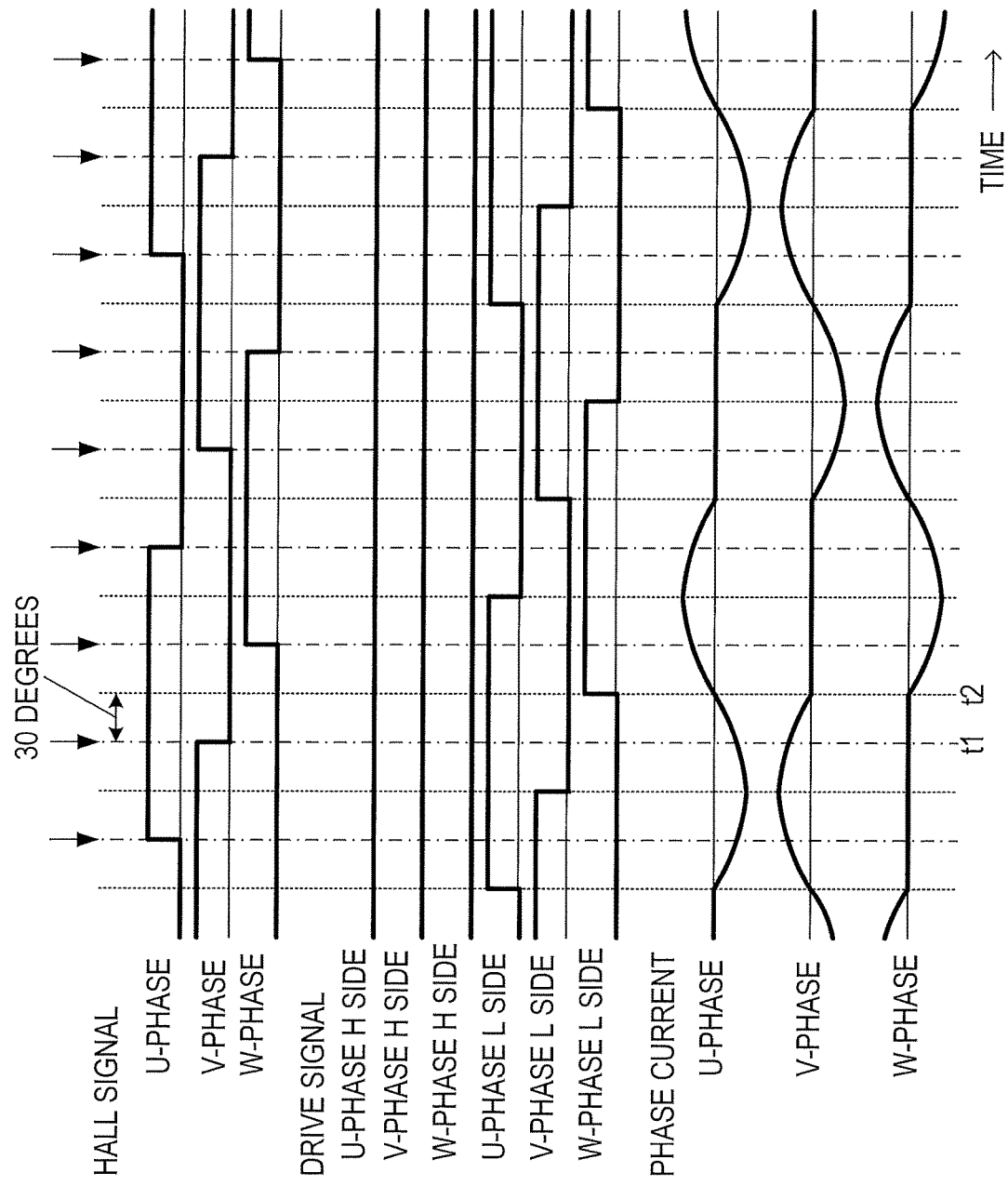
FIG. 7 is a time chart showing respective changes in Hall signals, drive signals, and phase currents in a two-phase short-circuit control.

As shown in FIG. 7, the rotation detector 28 configured as mentioned above outputs respective three Hall signals that correspond to the U-phase winding, the V-phase winding, and the W-phase winding. Differences in phase between the respective Hall signals are 120 degrees in electrical angle. Based on changes in the Hall signals, the control circuit 36 is able to detect a rotation speed of the motor 5.

In other words, in response to detection of an edge of each Hall signal where a logical value of each Hall signal is inverted, the control circuit 36 determines that the above-described detection signal is inputted. The control circuit 36 detects the rotation speed of the motor 5 based on a time interval in inputting the detection signals and a rotation angle (60 degrees in electrical angle).

Further, the control circuit 36 recognizes a rotational position of the motor 5 based on the detection signals from the rotation detector 28, to thereby control a time for switching the switching elements Q1 to Q6 to the respective ON-states or OFF-states. Such an operation of the control circuit 36 controls the electric current that flows through the motor 5 during the driving and the braking of the motor 5.

Hereinafter, a description is given to a control process that is executed in the control circuit 36 to control the driving and the braking of the motor 5.

Figure 3:
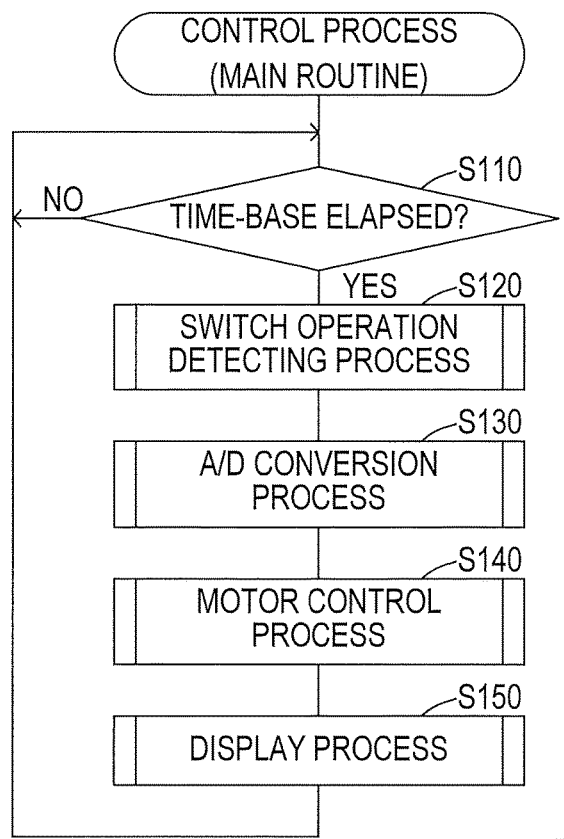
FIG. 3 is a flowchart showing control process that is executed in a control circuit.

As shown in FIG. 3, the control circuit 36 repeatedly executes a series of processes S120 to S150 (S refers to a step) in a specific control cycle (a time-base).

Specifically, the control circuit 36 determines in S110 whether the time-base is elapsed to thereby wait for the specific control cycle to be elapsed (S110: NO). In response to determination in S110 that the time-base is elapsed (S110: YES), the control circuit 36 proceeds to a process in S120.

In S120, the control circuit 36 executes a switch operation detection process. In this process, the control circuit 36 confirms an ON-state and an OFF-state of the trigger SW16 to thereby detect operation of the trigger SW16 made by the user. In response to completion in executing the switch operation detection process, the control circuit 36 proceeds to a process in S130.

In S130, the control circuit 36 executes an analog-digital (A/D) conversion process. In this process, the control circuit 36 converts the detection signal outputted from the battery voltage detector 24 and the detection signal outputted from the electric current detection circuit 26 from an analog form to a digital form (A/D conversion) and acquires converted detection signals.

In the subsequent S140, the control circuit 36 executes a motor control process. In this process, the control circuit 36 controls the driving and the braking of the motor 5 based on the ON state and the OFF state of the trigger SW16, the battery voltage value, and the motor current value that are read by the control circuit 36 in S120 and S130.

In the subsequent S150, the control circuit 36 executes a display process. In this process, the control circuit 36 detects a state of a driving system of the motor 5 and a state of a braking system of the motor 5 based on the battery voltage value and the motor current value, and displays the detected states via the LED-display 18. In the display process, the control circuit 36 controls, for example, a lighting color or a lighting pattern of the LED-display 18 to thereby identifiably display to the user: whether the grinder 2 is under proper operation; and a detail of a failure state upon occurrence a failure. The control circuit 36 returns to the process in S110 in response to completion of the display process.

Figure 4:
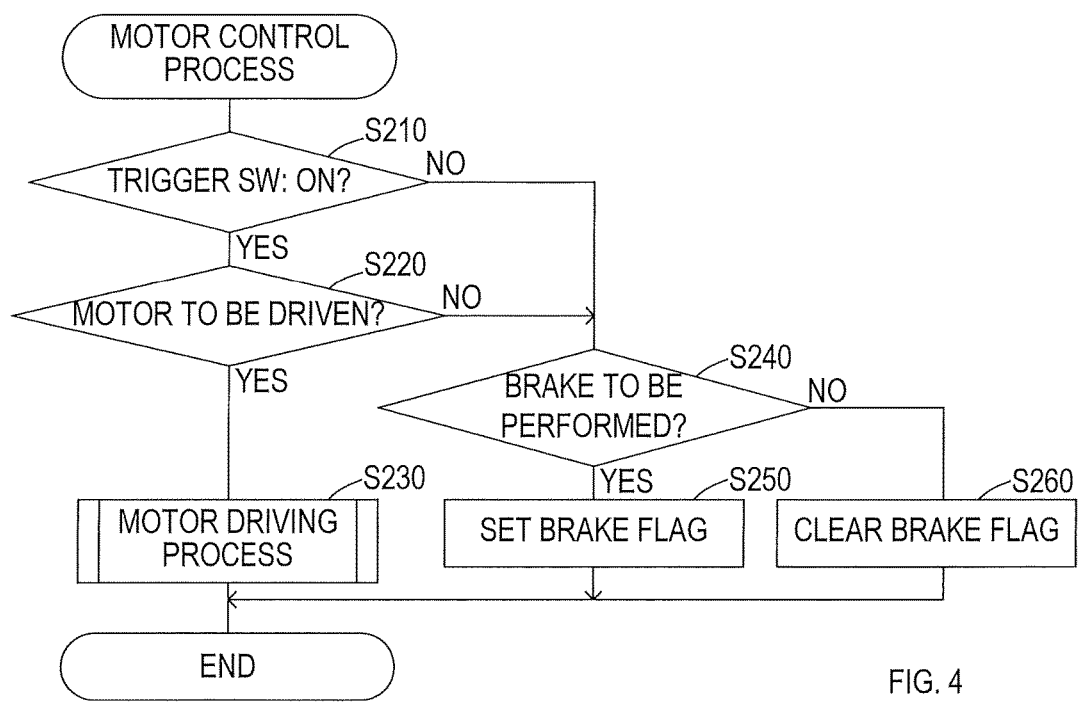
FIG. 4 is a flowchart showing a detail of a motor control process.

The motor control process in S140 will be described in detail. As shown in FIG. 4, the control circuit 36 determines in S210 whether the trigger SW16 is placed in the ON-state. If the trigger SW16 is not placed in the ON-state (S210: NO), a drive command for the motor 5 is not inputted to the control circuit 36. Accordingly, the control circuit 36 proceeds to a process in S240.

In response to determination in S210 that the trigger SW16 is placed in the ON-state (S210: YES), the control circuit 36 proceeds to a process in S220 and determines, based on the above-described battery voltage value and the motor current value, whether the motor 5 can be driven.

If the motor 5 can be driven (S220: YES), the control circuit 36 proceeds to a process in S230 to drive the motor 5. If the motor 5 cannot be driven (S220: NO), the control circuit 36 proceeds to a process in S240.

In S230, the control circuit 36 executes a motor driving process. In this process, the control circuit 36 calculates a drive duty ratio for the bridge circuit 32 so as to gradually increase the rotation speed (or the drive current) of the motor 5 to a target rotation speed (or a target current value) to thereby control the motor 5 to be placed in a target rotation state. The control circuit 36 terminates the motor driving process in response to completion of the motor control process.

In S240, the control circuit 36 determines, based on the above-described changes in the Hall signals, whether the motor 5 is currently in rotation and requires a braking force to be generated (in other words, determines whether a condition for executing a brake control is established).

If execution of the brake control is required (S240: YES), the control circuit 36 proceeds to a process in S250, sets a brake flag, and then terminates the motor control process. Conversely, if the execution of the brake control is not required (S240: NO), the control circuit 36 proceeds to a process in S260, clears the brake flag, and then terminates the motor control process.

A description will be given to a signal interruption process that is executed by the control circuit 36 every time the motor 5 rotates by 60 degrees in electrical angle in accordance with the detection signals (specifically, the respective Hall signals corresponding to the U-phase winding, the V-phase winding, and the W-phase winding) from the rotation detector 28.

Figure 5:
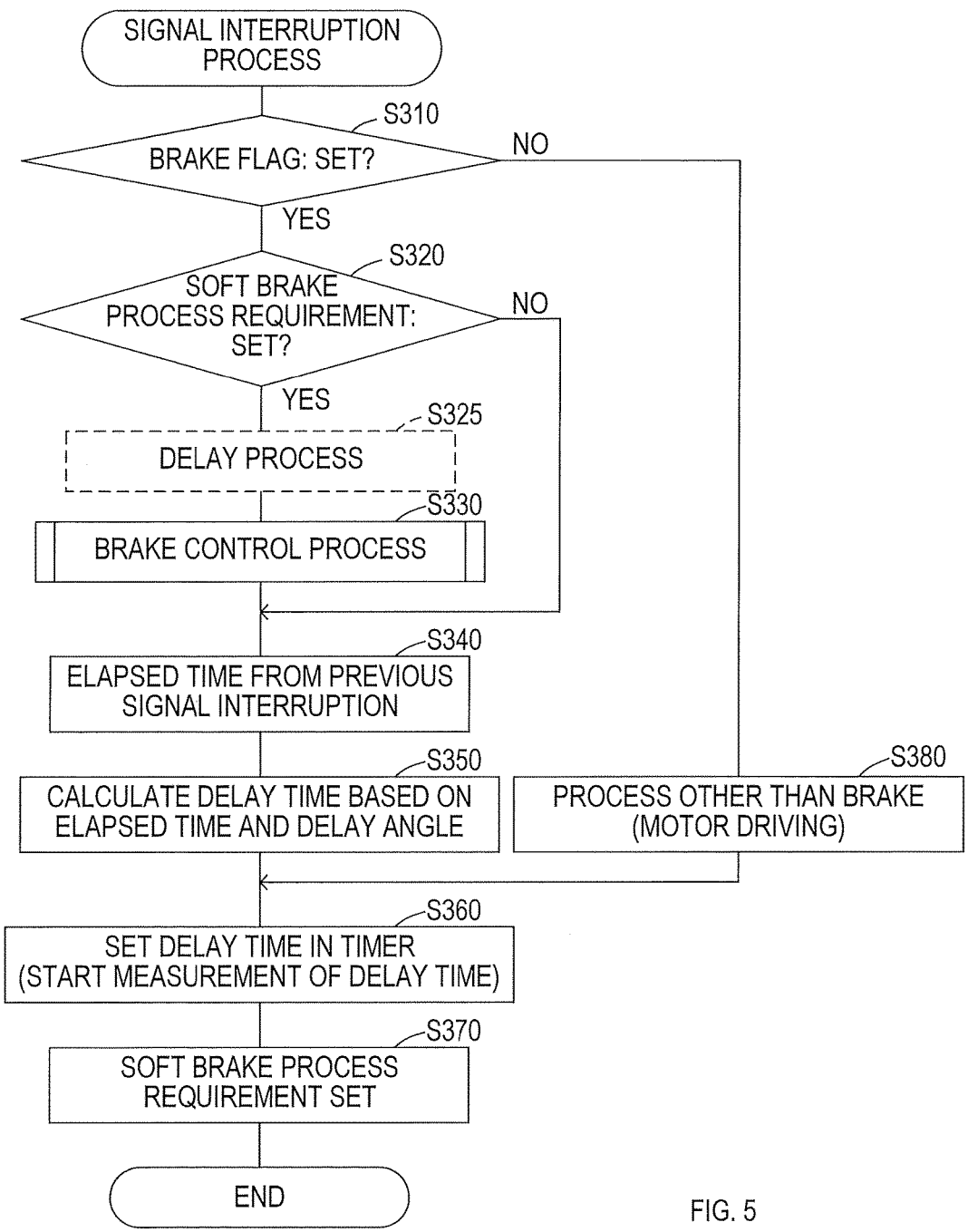
FIG. 5 is a flowchart showing a signal interruption process that is executed in the control circuit.

As shown in FIG. 5, in the signal interruption process, the control circuit 36 determines in S310 whether the brake flag is set. If the brake flag is set (S310: YES), the control circuit 36 proceeds to a process in S320 and determines whether a soft brake process requirement is set. The soft brake process requirement is provided to request execution of a two-phase short-circuit brake, which is set in a process subsequent to S320.

If the soft brake process requirement is not set (S320: NO), the control circuit 36 proceeds to a process in S340 and acquires an elapsed time since the preceding signal interruption process is started. In response to completion in acquiring the elapsed time, the control circuit 36 proceeds to a process in S350.

In S350, the control circuit 36 calculates a delay time based on the elapsed time that is acquired in S340 and a delay angle that is set in advance. The delay time corresponds to a period of time from a start of the signal interruption process until the switching elements Q1 to Q6 are next switched to the respective ON-states or the OFF-states.

The delay angle is an angle such as "30 degrees in electrical angle" as exemplary illustrated in FIG. 7. Specifically, the delay angle is set at the above-described ratio such as 50% and 80% with respect to the rotation angle (60 degrees in electrical angle) that corresponds to the elapsed time. Accordingly, the control circuit 36 calculates the delay time in S350 by multiplying a specific ratio (50% or 80%) with the elapsed time acquired in S340 that corresponds to a specific rotation angle.

In response to completion in calculating the delay time, the control circuit 36 sets the calculated delay time in a timer in the subsequent process in S360 and starts measurement of the delay time. Finally, the control circuit 36 sets in S370 the soft brake process requirement and terminates the signal interruption process.

In response to determination in S310 that the brake flag is not set (S310: NO), the control circuit 36 proceeds to a process in S380, executes a process other than the braking such as the motor driving, and then terminates the signal interruption process.

Figure 6:
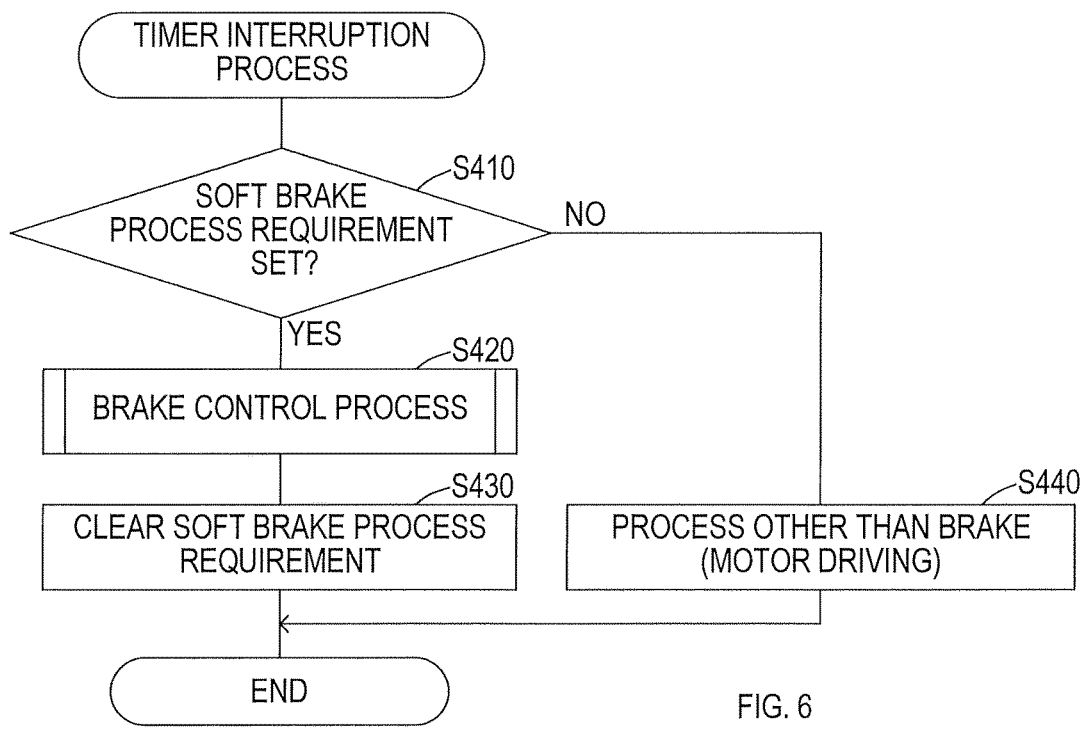
FIG. 6 is a flowchart showing a timer interruption process that is executed in the control circuit.

At a time period where the delay time set in the timer is elapsed, the control circuit 36 starts a timer interruption process shown in FIG. 6.

In the timer interruption process, the control circuit 36 first determines in S410 whether the soft brake process requirement is set. If the soft brake process requirement is set (S410: YES), the control circuit 36 proceeds to a brake control process in S420. In this process, the control circuit 36 allows the motor 5 to generate the braking force with the two-phase short-circuit brake.

In the brake control process, the control circuit 36 maintains, as exemplary illustrated in FIG. 7, all of the high-side switches (Q1 to Q3) to be in the respective OFF-states, and sequentially switches each of the low-side switches (Q4 to Q6) to the corresponding ON-state or the OFF-state in a specific pattern.

Accordingly, the control circuit 36 identifies in S420 the low-side switch that should be switched from the corresponding ON-state to corresponding the OFF-state, or from the corresponding OFF-state to the corresponding ON-state in the currently executed timer interruption process based on a specific control pattern, and then switches the identified low-side switch to the corresponding ON-state or the OFF-state (see, a time point t2) to thereby achieve the two-phase short-circuit brake.

Subsequent to execution of the brake control process mentioned above, the control circuit 36 proceeds to a process in S430, clears the soft brake process requirement, and then terminates the timer interruption process.

In response to determination in S410 that the soft brake process requirement is not set (S410: NO), the control circuit 36 proceeds to a process in S440, executes a process other than the braking such the motor driving, and then terminates the timer interruption process.

The process in S440 is executed on the basis that the delay time set in the timer in S380 in the signal interruption process is elapsed, which interlocks with the process in S380.

In the motor driving, for example, it is necessary to appropriately turn on the switching elements Q1 to Q6 at the drive duty ratio that is obtained in the above-described motor driving process in S230.

Accordingly, in S380 in the signal interruption process, the control circuit 36 sets, via the timer, respective times at which the switching elements Q1 to Q6 are switched to the respective ON-states or the OFF-states in a specific drive pattern. Further, in S440 of the timer interruption process, the control circuit 36 identifies, in accordance with the specific drive pattern, the switching element that should be switched to the corresponding ON-state or the OFF-state in the currently executed timer interruption process, and then switches the identified switching element to the corresponding ON-state or the OFF-state.

As described above, the control circuit 36 executes, in the timer interruption process, the brake control process in S420 to thereby achieves the two-phase short-circuit brake. However, when a variation occurs in interval between the detection signals (the Hall signals) from the rotation detector 28, as indicated in the middle section of FIG. 8, the delay time is set in the timer in the signal interruption process before switching the low-side switches to the respective ON-states or OFF-states in the timer interruption process. As a result, the brake control may not be executed properly.

In the present embodiment, if it is determined, in S320 in the signal interruption process shown in FIG. 5, that the soft brake process requirement is set, the signal interruption process proceeds to the process in S330 since the brake control process is not executed by the timer interruption process. Then, the brake process that should be executed in the timer interruption process is executed in S330 in place of the timer interruption process.

Figure 8:
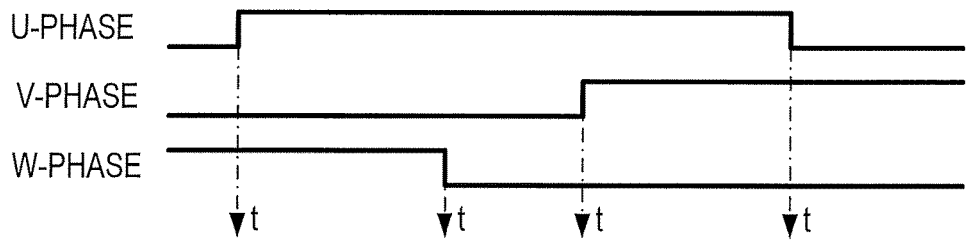
FIG. 8 is a time chart illustrating a defect in the two-phase short-circuit control that results from a variation in an input interval in a detection signal and a countermeasure therefor.
Figure 8:
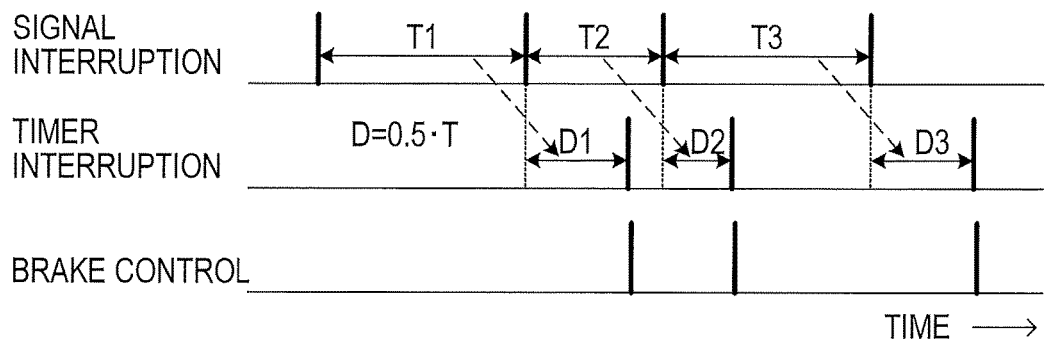
Figure 8:
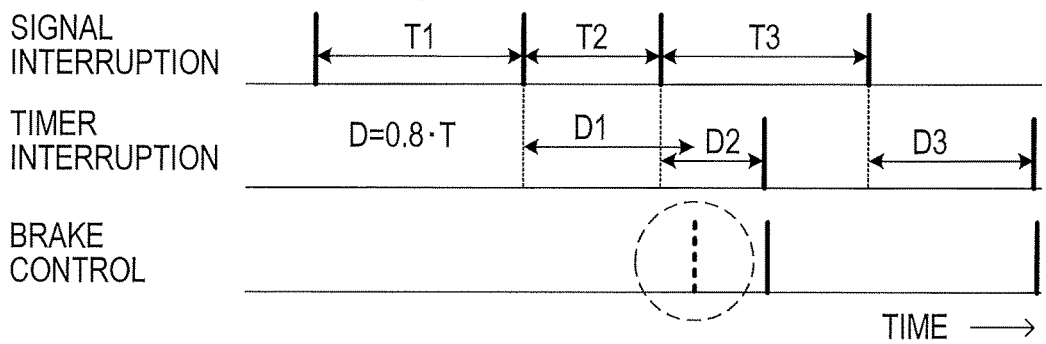
Figure 8:
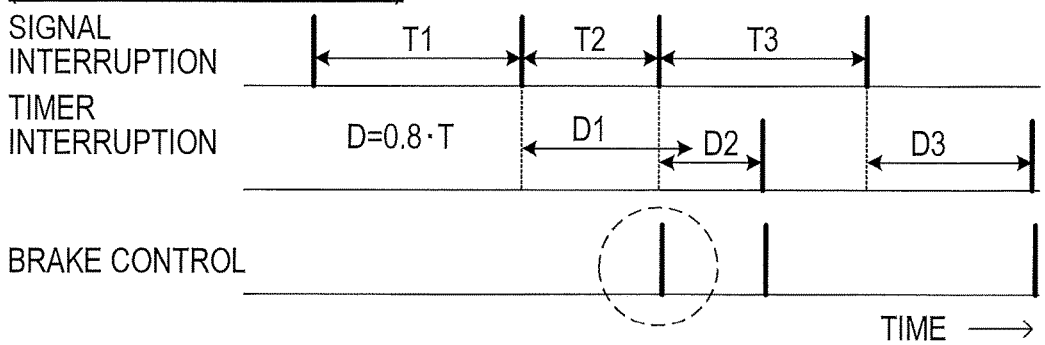

Consequently, as indicated in the lower section of FIG. 8, when the signal interruption process is executed without execution of the brake control process in the timer interruption process, the control circuit 36 enables in the signal interruption process the execution of the brake control (switching of the switching elements to the respective ON-states or the OFF-states) that should be executed in the timer interruption process.

Thus, the grinder 2 in the present embodiment enables the brake control to be properly executed even where the variation occurs in interval between the detection signals (the Hall signals) inputted from the rotation detector 28 and the next detection signal is inputted during a time period until elapse of the delay time set in the timer in the signal interruption process.

In the present embodiment, the control circuit 36 corresponds to one example of the brake controller of the present disclosure. In addition, of the control process that is executed by the control circuit 36, the signal interruption process achieves a function as one example of the timer setter of the present disclosure; and the timer interruption process achieves a function as one example of the switching controller of the present disclosure.

Although one embodiment of the present disclosure has been described above, the present disclosure is not limited to the aforementioned embodiment and may be modified in various forms.

For example, in the aforementioned embodiment, the soft brake process requirement is set in S320 in the signal interruption process. If it is determined that the brake control process is not executed in the timer interruption process, the control circuit 36 immediately executes the brake control process in S330.

However, the brake control process should be, in fact, executed at a time period at which the remaining time that should be measured in the timer is elapsed. Accordingly, the control circuit 36 may execute the brake control process in S330 in response to elapse of the remaining time.

It should be noted that measurement of the remaining time requires providing of another timer for measuring the remaining time in addition to the timer that is used to execute the timer interruption process. This may complicate the control process that is executed by the control circuit 36.

Accordingly, in response to determination in S320 in the signal interruption process that the soft brake process requirement is set (S320: YES), the control circuit 36 may proceed to a delaying process in S325 and waits for a specific time until the brake control process in S330 is executed.

In the aforementioned embodiment, the two-phase short-circuit brake is executed so as to set the high-side switches (Q1 to Q3) to the respective OFF-states and to switch any of the low-side switches (Q4 to Q6) to the corresponding ON-state or the OFF-state in accordance with the rotation of the motor 5.

However, the low-side switches (Q4 to Q6) may be set in the respective OFF-states and any of the high-side switches (Q1 to Q3) may be switched to the corresponding ON-state or the OFF-state to thereby execute the two-phase short-circuit brake.

The brake control for the motor 5 may be executed by a combination of the above-described two-phase short-circuit brake and the all-phase (or the three-phase) short-circuit brake.

In the aforementioned embodiment, a description has been given to the grinder 2 that is configured to drive the motor 5 by electric power supply from the first battery pack 20A and the second battery pack 20B. However, the electric working machine of the present disclosure is not limited to such a grinder.

The electric working machine of the present disclosure may be, for example, any kind of electric working machine that includes a battery pack. In addition, the electric working machine of the present disclosure may be operated by the electric power supply from an external direct-current power source such as an alternating current (AC) adapter or operated by the electric power supply from an AC power source such as a power source for commercial use.

In addition, two or more functions of one element in the aforementioned embodiment may be achieved by two or more elements; or one function of one element in the aforementioned embodiment may be achieved by two or more elements. Likewise, two or more functions of two or more elements may be achieved by one element; or one function achieved by two or more elements may be achieved by one element. A part of the configuration of the aforementioned embodiment may be omitted; and at least a part of the configuration of the aforementioned embodiment may be added to or replaced with another part of the configuration of the aforementioned embodiment. It should be noted that any and all modes that are encompassed in the technical ideas that are defined only by the languages in the claims are embodiments of the present disclosure.

What is claimed is:

1. An electric working machine, comprising:
   a tool;
   a three-phase brushless motor including a first terminal, a second terminal, and a third terminal and configured to generate a driving force for driving the tool;
   a first high-side switch provided between the first terminal and a positive electrode of a direct-current power source, the first high-side switch being configured to electrically couple the first terminal to the positive electrode in an ON-state, and the first high-side switch being configured to electrically decouple the first terminal from the positive electrode in an OFF-state;
   a second high-side switch provided between the second terminal and the positive electrode, the second high-side switch being configured to electrically coupled the second terminal to the positive electrode in an ON-state, and the second high-side switch being configured to electrically decouple the second terminal from the positive electrode in an OFF-state;
   a third high-side switch provided between the third terminal and the positive electrode, the third high-side switch being configured to electrically couple the third terminal to the positive electrode in a ON-state, and the third high-side switch being configured to electrically decouple the third terminal from the positive electrode in an OFF-state;
   a first low-side switch provided between the first terminal and a negative electrode of the direct-current power source, the first low-side switch being configured to electrically couple the first terminal to the negative electrode in an ON-state, and the first low-side switch being configured to electrically decouple the first terminal from the negative electrode in an OFF-state;
   a second low-side switch provided between the second terminal and the negative electrode, the second low-side switch being configured to electrically couple the second terminal to the negative electrode in an ON-state, and the second low-side switch being configured to electrically decouple the second terminal from the negative electrode in an OFF-state;
   a third low-side switch provided between the third terminal and the negative electrode, the third low-side switch being configured to electrically couple the third terminal to the negative electrode in an ON-state, and the third low-side switch being configured to electrically decouple the third terminal from the negative electrode in an OFF-state;
   a rotation detector configured to generate a detection signal that indicates a rotation position of the three-phase brushless motor every time the three-phase brushless motor rotates by a specific angle; and
   a control circuit configured to execute a signal interruption process and a timer interruption process,
   wherein the control circuit is configured to execute the signal interruption process in response to occurrence of the detection signal,
   wherein the signal interruption process includes:
     executing a brake control process in response to a soft brake process requirement being set, the soft brake process requirement requesting execution of a two-phase short-circuit brake;
     calculating a delay time based on an elapsed time since the signal interruption process is previously executed and a delay angle; and
     setting the delay time calculated in a timer to start measurement of the delay time by the timer,
   wherein the control circuit is further configured to execute the timer interruption process in response to elapse of the delay time,
   wherein the timer interruption process includes:
     executing the brake control process in response to the soft brake process requirement being set; and
     clearing the soft brake process requirement in response to completion of the brake control process, and
   wherein the brake control process includes:
     setting the first high-side switch, the second high-side switch, and the third high-side switch to the respective OFF-states; and
     switching any one of the first low-side switch, the second low-side switch, and the third low-side switch to the corresponding ON-state or the OFF-state in accordance with the rotation position of the three-phase brushless motor so as to place any two of the first low-side switch, the second low-side switch, and the third low-side switch to the respective ON-states and to place any remaining low-side switch of the first low-side switch, the second low-side switch, and the third low-side switch in the corresponding OFF-state.

2. An electric working machine, comprising:
   a three-phase brushless motor including a first terminal, a second terminal, and a third terminal;
   a first switching element provided between the first terminal and a first electrode of a direct-current power source, the first switching element being configured to electrically couple the first terminal to the first electrode in an ON-state, and the first switching element being configured to electrically decouple the first terminal from the first electrode in an OFF-state;

a second switching element provided between the second terminal and the first electrode, the second switching element being configured to electrically couple the second terminal to the first electrode in an ON-state, and the second switching element being configured to electrically decouple the second terminal from the first electrode in an OFF-state;

a third switching element provided between the third terminal and the first electrode, the third switching element being configured to electrically couple the third terminal to the first electrode in an ON-state, and the third switching element being configured to electrically decouple the third terminal from the first electrode in an OFF-state;

a fourth switching element provided between the first terminal and a second electrode of the direct-current power source, the fourth switching element being configured to electrically couple the first terminal to the second electrode in an ON-state, and the fourth switching element being configured to electrically decouple the first terminal from the second electrode in an OFF-state;

a fifth switching element provided between the second terminal and the second electrode, the fifth switching element being configured to electrically couple the second terminal to the second electrode in an ON-state, and the fifth switching element being configured to electrically decouple the second terminal from the second electrode in an OFF-state;

a sixth switching element provided between the third terminal and the second electrode, the sixth switching element being configured to electrically couple the third terminal to the second electrode in an ON-state, and the sixth switching element being configured to electrically decouple the third terminal from the second electrode in an OFF-state;

a rotation detector configured to generate a detection signal that indicates a rotation position of the three-phase brushless motor every time the three-phase brushless motor rotates by a specific angle; and a brake controller configured to execute a two-phase short-circuit brake, wherein the two-phase short-circuit brake is executed so as to set the first switching element, the second switching element, and the third switching element to the respective OFF-states and to switch any of the fourth switching element, the fifth switching element, and the sixth switching element to the corresponding ON-state or the OFF-state in accordance with a switching time that is based on the detection signal, and wherein the two-phase short-circuit brake is further executed so as to switch any of the fourth switching element, the fifth switching element, and the sixth switching element to the corresponding ON-state or the OFF-state in response to the detection signal that occurs prior to the switching time.

3. The electric working machine according to claim 2, further comprising a timer that is configured to measure a time, wherein the brake controller includes a timer setter that is configured to set in the timer a delay time until arrival of the switching time based on the detection signal and to start measurement for the delay time by the timer.

4. The electric working machine according to claim 3, wherein the brake controller includes a switching controller that is configured to switch the any of the fourth switching element, the fifth switching element, and the sixth switching element to the corresponding ON-state or the OFF-state in response to completion of the measurement for the delay time by the timer.

5. The electric working machine according to claim 4, wherein the timer setter is configured to switch, in place of the switching controller, the any of the fourth switching element, the fifth switching element, and the sixth switching element to the corresponding ON-state or the OFF-state in response to the delay time being newly set in the timer based on the detection signal before elapse of the delay time that is previously set in the timer.

6. The electric working machine according to claim 3, wherein the timer setter is configured to switch, in response to the delay time being newly set in the timer based on the detection signal before elapse of the delay time that is previously set in the timer, the any of the fourth switching element, the fifth switching element, and the sixth switching element to the corresponding ON-state or the OFF-state within a specific time after the rotation position of the three-phase brushless motor reaches a specific rotation position that is acquired based on the detection signal.

7. The electric working machine according to claim 3, wherein the timer setter is configured to switch, in response to the delay time being newly set in the timer based on the detection signal before elapse of the delay time that is previously set in the timer, the any of the fourth switching element, the fifth switching element, and the sixth switching element to the corresponding ON-state or the OFF-state immediately after the rotation position of the three-phase brushless motor reaches a specific rotation position that is acquired based on the detection signal.

8. The electric working machine according to claim 2, wherein the first electrode corresponds to a positive electrode of the direct-current power source, and wherein the second electrode corresponds to a negative electrode of the direct-current power source.

9. The electric working machine according to claim 2, wherein the first electrode corresponds to a negative electrode of the direct-current power source, and wherein the second electrode corresponds to a positive electrode of the direct-current power source.

10. The electric working machine according to claim 2, wherein the brake controller is configured to execute the two-phase short-circuit brake in response to establishment of a brake condition during the three-phase brushless motor rotating.

11. A method for braking a three-phase brushless motor of an electric working machine, the method comprising:

generating a detection signal that indicates a rotation position of the three-phase brushless motor every time the three-phase brushless motor rotates by a specific angle;

setting a first switching element, a second switching element, and a third switching element to respective OFF-states in response to establishment of a brake condition during the three-phase brushless motor rotating, the first switching element being provided between a first terminal of the three-phase brushless motor and a first electrode of a direct-current power source, the first switching element being configured to electrically couple the first terminal to the first electrode in an ON-state, the first switching element being configured to electrically decouple the first terminal from the first electrode in the OFF-state, the second switching element being provided between a second terminal of the three-phase brushless motor and the first electrode, the second switching element being configured to electrically couple the second terminal to the first electrode in an ON-state, the second switching element being configured to electrically decouple the second terminal from the first electrode in the OFF-state, the third switching element being provided between a third terminal of the three-phase brushless motor and the first electrode, the third switching element being configured to electrically couple the third terminal to the first electrode in an ON-state, and the third switching element being configured to electrically decouple the third terminal from the first electrode in the OFF-state;

switching any of a fourth switching element, a fifth switching element, and a sixth switching element to a corresponding ON-state or an OFF-state in accordance with a switching time that is based on the detection signal in response to the establishment of the brake condition during the three-phase brushless motor rotating, the fourth switching element being provided between the first terminal and a second electrode of the direct-current power source, the fourth switching element being configured to electrically couple the first terminal to the second electrode in the ON-state, the fourth switching element being configured to electrically decouple the first terminal from the second electrode in the OFF-state, the fifth switching element being provided between the second terminal and the second electrode, the fifth switching element being configured to electrically couple the second terminal to the second electrode in the ON-state, the fifth switching element being configured to electrically decouple the second terminal from the second electrode in the OFF-state, the sixth switching element being provided between the third terminal and the second electrode, the sixth switching element being configured to electrically couple the third terminal to the second electrode in the ON-state, and the sixth switching element being configured to electrically decouple the third terminal from the second electrode in the OFF-state; and switching the any of the fourth switching element, the fifth switching element, and the sixth switching element to the corresponding ON-state or the OFF-state in response to the detection signal that occurs prior to the switching time.

\* \* \* \* \*